(12) United States Patent
Gettens

(10) Patent No.: US 7,042,641 B2
(45) Date of Patent: May 9, 2006

(54) SHAPED PLASTIC LENSES AND METHOD FOR MAKING THE SAME

(75) Inventor: Nancy J. Gettens, Waban, MA (US)

(73) Assignee: Polaroid Corporation, Waltham, MA (US)

( * ) Notice: Subject to any disclaimer, the term of this patent is extended or adjusted under 35 U.S.C. 154(b) by 61 days.

(21) Appl. No.: 10/805,759

(22) Filed: Mar. 22, 2004

(65) Prior Publication Data

US 2004/0227995 A1 Nov. 18, 2004

Related U.S. Application Data

(62) Division of application No. 09/966,179, filed on Sep. 28, 2001, now Pat. No. 6,746,631.

(51) Int. Cl.
*G02B 27/28* (2006.01)
*G02B 5/30* (2006.01)

(52) U.S. Cl. .................. 359/490; 359/485; 351/49; 351/177; 264/1.31; 264/1.32

(58) Field of Classification Search .......... 359/483, 359/485, 488, 490–493, 900; 264/1.32, 1.7, 264/1.31, 1.34, 2.7, 428, 479, 645, 241, 259, 264/266, 328.1, 331.19; 351/49, 163, 165, 351/177

See application file for complete search history.

(56) References Cited

U.S. PATENT DOCUMENTS

| | | | | |
|---|---|---|---|---|
| 2,237,567 A | 4/1941 | Land | | 88/65 |
| 2,445,555 A | 7/1948 | Binda | | 88/65 |
| 2,527,400 A | 10/1950 | Cooper, Jr. | | 88/65 |
| RE23,297 E | 11/1950 | Hyman, Jr. et al. | | 88/65 |
| 2,554,850 A | 5/1951 | Binda | | 88/65 |
| 3,560,076 A * | 2/1971 | Ceppi | | 359/491 |
| 3,940,304 A | 2/1976 | Schuler | | 156/245 |
| 4,166,871 A | 9/1979 | Schuler | | 427/163 |
| 4,985,648 A | 1/1991 | Tsuruoka et al. | | 307/456 |
| 4,986,641 A | 1/1991 | Braat | | 350/432 |
| 5,043,405 A | 8/1991 | Koseki et al. | | 526/245 |
| 5,434,707 A | 7/1995 | Daizell et al. | | 359/485 |
| 5,751,481 A * | 5/1998 | Dalzell et al. | | 359/485 |
| 6,650,473 B1 * | 11/2003 | Nakagoshi | | 359/490 |

* cited by examiner

*Primary Examiner*—Leonidas Boutsikaris

(57) ABSTRACT

There is described a method for forming lenses having substantially no optical power. The method includes forming, via in situ polymerization, a layer of non-uniform thickness of an optically clear, high scratch-resistant polymeric material on the convex surface of the lens. The lenses provided by the method are characterized by having maximum thickness in the central region of the lens and gradually diminishing thickness radially towards the periphery of the lens.

9 Claims, 3 Drawing Sheets

SHAPED PLASTIC LENSES AND METHOD FOR MAKING THE SAME

This is a division application of prior application Ser. No. 09/966,179, filed on Sep. 28, 2001 by Nancy J. Gettens and entitled SHAPED PLASTIC LENSES AND METHOD FOR MAKING THE SAME, now U.S. Pat. No. 6,746,631 B2.

BACKGROUND OF THE INVENTION

This application relates to shaped plastic lenses and to a method for their manufacture. More particularly, the application relates to plastic lenses having substantially no optical power, high impact-resistant and abrasion-resistant properties and to a method for forming such lenses wherein a high scratch-resistant convex surface of the lens is formed in situ during the method.

Curved light-polarizing laminates useful as lenses and comprising a layer of a molecularly-oriented light-polarizing material arranged between a pair of substrate sheets are well known. It is known to manufacture composite light-polarizing lenses, which include a layer of an optical quality polymeric material on each side of a shaped light-polarizing member. U.S. Pat. No. 3,940,304 describes a technique, which includes in situ polymerization of the optical quality polymeric material layers in a mold. An optical quality monomeric material is inserted into a shaping mold so as to cover both surfaces of the light-polarizing member and heat is applied to cause polymerization of the monomeric material to occur thereby resulting in the formation of a composite polymeric light-polarizing lens structure.

Further, it is known to make lenses, which have substantially, no optical power by shaping a composite lens, blank in a mold. For example, U.S. Pat. No. 5,434,707 teaches a method for forming shaped plastic lenses having substantially no optical power and comprising a laminate of a light-polarizing layer arranged between a pair of thermoplastic substrate sheets. According to the method, the composite lens blank is inserted into a mold which has heated curved platens and subjected to heating and pressing such that the thermoplastic substrate sheets are deformed and rendered flowable with the result that there is produced a composite lens which has substantially no optical power. The method requires lens-forming platens having predetermined radii of curvature which make possible, under the heating and pressing conditions, the production of plastic lenses of non-uniform thickness, that is, lenses which are thickest in the central region and of diminishing thickness radially to the periphery thereof. Although the method taught by the '707 patent provides shaped plastic lenses having substantially no optical power and of good durability, it is not completely satisfactory for all situations.

As the state of the art advances, efforts are made to provide new plastic lenses, which can meet new performance requirements, and to reduce or eliminate some of the undesirable characteristics of the prior art materials. For example, there is a continuing demand for high impact-resistant, plastic lenses, which have substantially no optical power for various uses such as in sporting events. However, simply making high impact-resistant plastic lenses by shaping in a mold a lens blank made of a high impact-resistant plastic material is not completely satisfactory since such high impact-resistant materials typically exhibit high optical stress properties and tend to develop cracks under the heating and pressure conditions required to shape the lens. Thus, it would be advantageous to have a method for making shaped lenses which have substantially no optical power and high impact strength and which are suitable for use in eyeglasses. It would also be advantageous to have shaped lenses which have substantially no optical power and which possess a high scratch-resistant convex surface.

SUMMARY OF THE INVENTION

It has now been found that shaped, or curved, plastic lenses having substantially no optical power can be provided according to the invention by forming, via in situ polymerization, a layer of an optically clear, high scratch-resistant polymeric material on the convex surface of the lens. The method of the invention is carried out in a mold, which comprises heated curved platens. An appropriate amount of a suitable polymerizable composition comprising a monomer or an oligomer is inserted onto the concave surface of one platen. A planar lens blank of substantially uniform thickness is interposed between the platens, which are then heated and pressed together. The polymerizable composition is thereby caused to cover the convex surface of the shaped lens structure and polymerize to form a layer of non-uniform thickness which is thickest in the central region and has a thickness gradient diminishing gradually radially towards the periphery of the lens.

In a preferred embodiment the lens blank which is utilized is a composite structure comprising a layer of light-polarizing material between a plurality of thermoplastic substrate layers. There is thus provided according to the invention lenses, which are suitable for use in sunglasses.

The advantageous shaped plastic lens thus formed, convex on one side and concave on the other side, has substantially no optical power and comprises one or more transparent layers of substantially uniform thickness on the concave side and, on the convex side, a transparent layer of thermoplastic material having high scratch resistance and non-uniform thickness, with the maximum thickness of this layer being in the central region of the lens and the thickness diminishing gradually radially toward the periphery of the lens. Thus, the advantageous lens structure of the invention has an overall non-uniform thickness with the maximum thickness of the lens being in the central region and the thickness diminishing gradually radially towards the periphery of the lens.

Further in accordance with the invention there is provided a method for forming a shaped plastic lens having substantially no optical power, convex on one side and concave on the other side, and having its maximum thickness in the central region and diminishing gradually in thickness radially towards its periphery, the method comprising the steps of:

placing a lens blank comprising one or more transparent substantially uniformly thick layers of thermoplastic material between opposed concave and convex platens for forming, respectively, convex and concave surfaces on the lens blank, the radius of curvature ($r_1$) of the concave platen and the radius of curvature ($r_2$) of the convex platen each corresponding substantially to the relationship $$r_1 + r_2 = t\left(\frac{n-1}{n}\right)$$

wherein t represents the thickness of the lens blank and n is the index of refraction;

placing a volume of a polymerizable composition on the concave platen; and heating and pressing the platens together with the lens blank between them, the heating and pressing being such as to cause the lens blank to deform and to conform one surface to the convex platen and to cause the polymerizable composition to polymerize and form a transparent layer of non-uniform thickness conforming to the concave platen, with the layer thus formed in situ having its maximum thickness in the central region of the lens and diminishing gradually in thickness radially towards the periphery of the lens.

The advantageous method of the invention allows the manufacture of lenses which have high impact strength and a high scratch-resistant convex surface.

BRIEF DESCRIPTION OF THE DRAWINGS

For a better understanding of the invention, as well as other objects and further features thereof reference is made to the following detailed description of various preferred embodiments thereof taken in conjunction with the accompanying drawings wherein.

DESCRIPTION OF THE PREFERRED EMBODIMENTS

Figure 1:
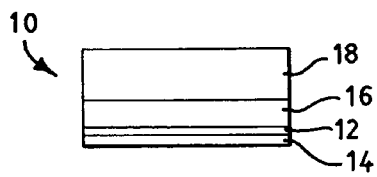
FIG. 1 is a partially schematic, side cross-sectional view of a preferred embodiment of a lens blank which can be used in the manufacture of a plastic lens according to the invention having substantially no optical power.

As described previously, the present invention is directed to shaped plastic lenses having substantially no optical power and to a method for the production of such lenses. As applied to a plastic lens of the invention, reference to a lens of substantially no optical power refers, in general, to the absence of magnification or demagnification. Thus, a lens will be considered as having substantially no optical power where the power is sufficiently low as not to be discernible or detectable by the human eye or where the power is within the limits of a published industry standard for no power lenses. The production of such lenses according to the invention requires substantial adherence to the requirement of lens-forming platens having predetermined radii of curvature surfaces which result, under the heating and pressure conditions utilized according to the method of the invention, in the formation of shaped plastic lenses which are of non-uniform thickness, with the maximum thickness being in the central region of the lens and the thickness diminishing gradually radially towards the periphery of the lens. Thus, the radii of curvature of the respective platens used for forming the concave and convex surfaces of the lenses of the invention conform to an important relationship which is described in greater detail hereinafter and which is predetermined to provide lenses of substantially no optical power.

The requirements for producing lenses of the invention having substantially no optical power can be better understood by reference to the mathematical formula (I) for the principal focus (F) of a thick lens of thickness (t) disclosed in the Handbook of Chemistry and Physics 53$^{rd}$ edition, 1972, published by the Chemical Rubber Company, page F-85, as follows:

$$F = \frac{nr_1 r_2}{(n-1)[n(r_1 + r_2) - t(n-1)]} \tag{I}$$

where $r_1$ and $r_2$ represent the radii of curvature of the lens and n is the index of refraction.

In the case of a lens of zero power, F is equal to infinity, in which case:

$$n(r_1+r_2)=(n-1)t \tag{II}$$

Assuming an index of refraction (n) of 1.5, the radii of curvature, ($r_1$ and $r_2$) relate to the thickness of the lens according to the formula $$r_1+r_2=t/3$$

Thus, where a composite laminate of a thickness of 0.100 inch (100 mils) is to be formed into a lens using a platen having a concave surface with a radius of curvature ($r_1$) of 3.514 inches (in order to form the convex side of the lens) it will be seen that the platen used to form the concave side of the lens will have a convex surface having a radius of curvature ($r_2$) of 3.481 inches.

In contrast, and as is known in the art, the optical power (P) of a lens of uniform thickness (T) is represented by the formula $$P = -P_o^2 T\left(\frac{1}{n-1} - \frac{1}{n}\right), \tag{IV}$$

where T is expressed in meters. If the index of refraction (n) is 1.5 and the nominal power (P), which is equal to the square root of the product of the powers of each of the opposed surfaces, is six, then $$P = -36T\left(\frac{1}{1.5-1} - \frac{1}{1.5}\right) \tag{V}$$

and $$P=-48T \tag{VI}$$

It can be calculated from formula VI that $$P=-0.00122t \tag{VII}$$

where the thickness (t) is expressed in mils. The power (in diopters) of lenses of different thickness can be calculated readily, using formula VII and examples of the power of lenses of different uniform thickness are set forth in the following TABLE I wherein focal length is expressed in meters.

TABLE I

| t(mils) | P (diopters) | Focal Length |
|---|---|---|
| 30 | −0.0366 | −27.3 |
| 45 | −0.0549 | −18.2 |
| 60 | −0.0732 | −13.66 |
| 75 | −0.0915 | −10.93 |
| 90 | −0.1098 | −9.11 |
| 100 | −0.1220 | −8.20 |

It will be seen from inspection of formula VII and from the data in TABLE I that an increase in the thickness of a lens of uniform thickness results in an increase in power. Thus, where lens thickness is increased for the realization of such desirable attributes as improved rigidity and durability, there is an accompanying and undesirable increase in lens power.

The requirements for the lens-forming surfaces of platens used for the production of lenses of the invention having substantially no power and non-uniform thickness can be better understood by considering the radii of curvature of platens useful for forming lenses of uniform thickness. For example, an "onion" lens having opposed convex and concave sides and uniform thickness can be analogized to concentric rings of an onion slice. Each onion ring of the same and uniform thickness is defined by convex and concave radii. These radii have different values for each slice. The respective radii for each slice also vary with progression of the rings outwardly to the onion surface. Transparent plastic substrate materials, by analogy to such rings, can be molded into lenses of uniform thickness and the requirements of radii of curvature for platens can be determined readily by analogy to the geometry of an onion. Such lenses, however, have optical power which, as described previously, increases with thickness.

Plastic lenses having a convex surface of high scratch-resistant thermoplastic material can be produced according to the invention by using platens of different predetermined radii of curvature and thermoplastic substrate materials and shaping conditions of heat and pressure, in conjunction with forming a layer of non-uniform thickness by in situ polymerization, that negate the development of optical power and that promote instead the formation of lenses of non-uniform overall thickness and substantially no optical power. The particular requirements of radii of curvature and the requirements in respect of the materials and shaping conditions that permit the production of lenses of the invention are described in detail hereinafter.

As described previously, the method of the invention relates generally to the formation of shaped plastic lenses of non-uniform thickness having substantially no optical power wherein a layer of non-uniform thickness is formed via in situ polymerization. Thus, generally, a lens blank used to form lenses according to the invention can be a planar structure comprising a substantially uniformly thick layer or layers of suitable thermoplastic material(s). The method of the invention will be described further in detail with respect to the preferred embodiment of the invention wherein the lens blank used to form lenses according to the invention is a composite structure comprising a layer of a light-polarizing material between layers of thermoplastic substrate material.

Referring now to FIG. 1, there is shown, a laminated structure 10 of layers, or sheets, 12, 14, 16 and 18 from which a plastic light-polarizing lens according to the invention can be formed. Layer, or sheet, 12 comprises a molecularly oriented light-polarizing material which provides the light-polarizing functionality of the preferred shaped lens of the invention. Typically, light-polarizing layer 12 comprises a linear molecularly oriented dichroic material having a thickness in the range of from about 0.1 to about 3 mils (about 0.0025 to about 0.076 mm) and preferably about 0.5 mils (about 0.0125 mm).

A preferred material for use as light-polarizing layer 12 is a layer of stretched, or oriented, poly(vinyl alcohol) of about five mil thickness stained according to known methods with a dichroic dye such as iodine. Such a polarizing material will also preferably be borated for improved stability. Suitable polarizing layers of this type can be prepared utilizing methods described in Reissue U.S. Pat. No. Re. 23,297 and in U.S. Pat. No. 4,166,871. Another preferred polarizing material is a stretched poly(vinyl alcohol) sheet containing polyvinylene light-polarizing species such as may be provided by hydrochloric acid vapor processing according to known methods. Preferably, such polarizing material will be borated for improved stability. Suitable light-polarizing materials of this type can be prepared by the method described in U.S. Pat. No. 2,445,555. Other light-polarizing materials can, however, be employed and methods for their production can be found in U.S. Pat. Nos. 2,237,567, 2,527, 400 and 2,554,850.

In the production of light polarizers, one or more support, or carrier, sheets can be employed to improve the durability and handling characteristics of the light-polarizing material. Support sheets of cellulose acetate, cellulose triacetate, cellulose acetate butyrate (CAB), or of other polymeric material can be used for this purpose. An adhesive can be used to promote desired bonding without forming bubbles, haze or other visible defects. Suitable adhesives are known in the art.

Layers 14 and 16 comprise thermoplastic material, which can be molded or shaped to the desired curvature for lenses of the invention. Transparent thermoplastic resins known to be useful in the production of optical elements can be used for layers 14 and 16. Typical suitable thermoplastic materials include poly (methyl methacrylate), polystyrene, polycarbonate and cellulosic thermoplastic materials such as cellulose nitrate, cellulose acetate, cellulose triacetate, cellulose acetate propionate, cellulose acetate butyrate and ethyl cellulose. Generally, suitable materials are those which are transparent and which exhibit good durability and moldability. In addition, it will be beneficial that the resinous materials of layers 14 and 16 exhibit low birefringence and that they exhibit good heat resistance and moisture resistance. Layers 14 and 16 of resinous material can be selected from the resinous materials previously mentioned, although other materials can be used. It will be apparent that the moldability or processability of the resinous materials comprising layers 14 and 16 has to be taken into consideration insofar as the required molding or lens-shaping conditions of temperature and pressure may influence the physical and optical properties of the light polarizer confined between such layers. Thus, layers 14 and 16 comprise a thermoplastic material moldable into a curved lens according to the invention without degradation or other harmful and undesirable influence on light polarizer layer 12.

In general, poly (methyl methacrylate) resins exhibit good durability, transparency and processability and the beneficial attributes and limitations of poly (methyl methacrylate) and others of the aforementioned materials, insofar as their adaptability to the production of optical elements is concerned, are known and described, for example, in U.S. Pat. Nos. 4,986,641 and 5,043,405. Homopolymers of methyl methacrylate and other methacrylate polymers such as norbornyl methacrylate can be used, as can methacrylic copolymers which include repeating units from methyl methacrylate and from other copolymerizable monomers. Examples of such homopolymers and copolymers can be found in the aforementioned U.S. Pat. Nos. 4,985,648 and 5,043,405.

Preferred materials for layers 14 and 16 are cellulose acetate butyrate and polycarbonate. Cellulose acetate butyrate is preferred for use in layer 14 because it has a low coefficient of stress. Polycarbonate is a preferred material for layer 16 because of its high impact-resistant properties. In a particularly preferred embodiment layer 14 comprises an approximately 0.005 inch (0.127 mm) thick layer of cellulose acetate buytrate and layer 16 comprises an approximately 0.015 to 0.030 inch (0.381 to 0.762 mm) thick layer of colored polycarbonate. The coloration may be provided by incorporating visible dyes in layer 16 to provide contrast and aesthetic qualities. Optionally, and preferably, the lens blank includes an approximately 0.015 to 0.030 inch (0.381 to 0,762 mm) thick clear polycarbonate layer 18. In this preferred embodiment the concave surface of the lens preferably includes a hardcoat, or a high scratch resistant layer, since polycarbonate typically scratches easily. It is preferred to utilize a clear polycarbonate layer with a hardcoat layer as layer 18.

Layers 14, 16 and 18 can each comprise one or more layers. Good results can be obtained using a single layer for each of respective layers 14, 16 and 18. Generally, it is preferred that layer 16 and optional layer 18, when present, have a thickness greater than that of layer 14. A differential in thickness permits light polarizing material 12 to be positioned in lens 50 (FIG. 6) more closely to the convex surface of the lens than to the concave surface. It is advantageous to have the layer of light-polarizing material 12 located as close as possible to the convex surface of the lens so that there is the least opportunity for the material through which light must pass before the light strikes the light-polarizing material to interfere with the absorption of polarized light. Said another way, the material though which light passes before striking the light-polarizing material should not have any substantial birefringence. In addition, the employment of one or more layers of a thickness substantially greater than that of the other layer provides a greater latitude of processing, for example, temperature and pressure, conditions which can be employed in the lens-shaping operation without detrimental influence on the physical integrity and optical properties of light-polarizer 12. Optional layer 18 may be the same thickness as layer 16 or may be of different thickness.

In a particularly preferred shaped lens of the invention, layer 14 comprises an approximately 0.005 inch (0.127 mm) thick layer of cellulose acetate butyrate, layer 16 comprises an approximately 0.015 inch (0.381 mm) thick layer of colored polycarbonate and layer 18 an approximately 0.030 inch (0.762) thick layer of clear polycarbonate having a hardcoat layer, i.e., a layer of a high scratch-resistant material, on the outer surface.

As described previously, the layers of the lens bank may be adhered to each other by adhesives. Various adhesives can be employed for this purpose, provided that they are substantially transparent and provide a haze-free lamination free of bubbles and other unacceptable and visible defects. The respective layers 14, 16 and, when present, 18 can, if desired, include various additives for their known and predetermined effects. Stabilizers such as ultraviolet light absorbers, antioxidants, mold-release agents, lubricating agents, surface active agents and elastomers can be present.

Dyes such as gray, yellow, blue or other colored dyes can also be employed to obtain a lens of a desired density or color. Layer 16, or layer 18, when present, can include an abrasion-resistant layer, or coating, to improve the resistance of the concave surface of the lenses to scratching and abrasion. Such a layer can comprise, for example, a thermosetting, cross-linked polymeric material.

Figure 6:
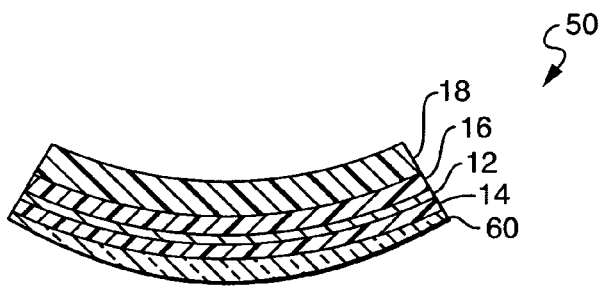
FIG. 6 is a partially schematic, side cross-sectional view of a preferred embodiment of a shaped plastic lens according to the invention having substantially no optical power.

The laminate composite structure 10 shown in FIG. 1 and from which a light-polarizing lens structure 50 such as is shown in FIG. 6 can be produced, can be produced and used in various manners. For example, unitary blanks having the structure shown in FIG. 1 can be formed and then molded, or shaped, to a desired lens, each blank being produced by a lamination of precut components 12, 14, 16 and 18 of square, round, elliptical or other shapes. Such blanks can be formed under heat and pressure into a lens according to the invention and the edges thereof can be ground in known manner suitable to adapt them to placement into spectacle frames. Preferably, a composite structure of finite or endless length can be formed by a continuous or semi-continuous method whereby webs or pieces of thermoplastic sheet material are adhered to the opposing sides of a light-polarizing layer. Individual blanks can then be cut from the laminate structure using a cutting apparatus such as a saw, knife, laser, etc. Such a cutting operation can be carried out at any time prior to the shaping thereof in an apparatus such as a press-forming apparatus.

Individual blanks can be pretreated as desired before shaping. For example, lens blanks of predetermined dimensions suited for the particular forming apparatus employed can be heated and placed immediately or after substantial cooling into the forming apparatus.

The method of the invention by which lenses having substantially no optical power are formed will now be described in connection with FIG's. 2 through 5.

Figure 2:
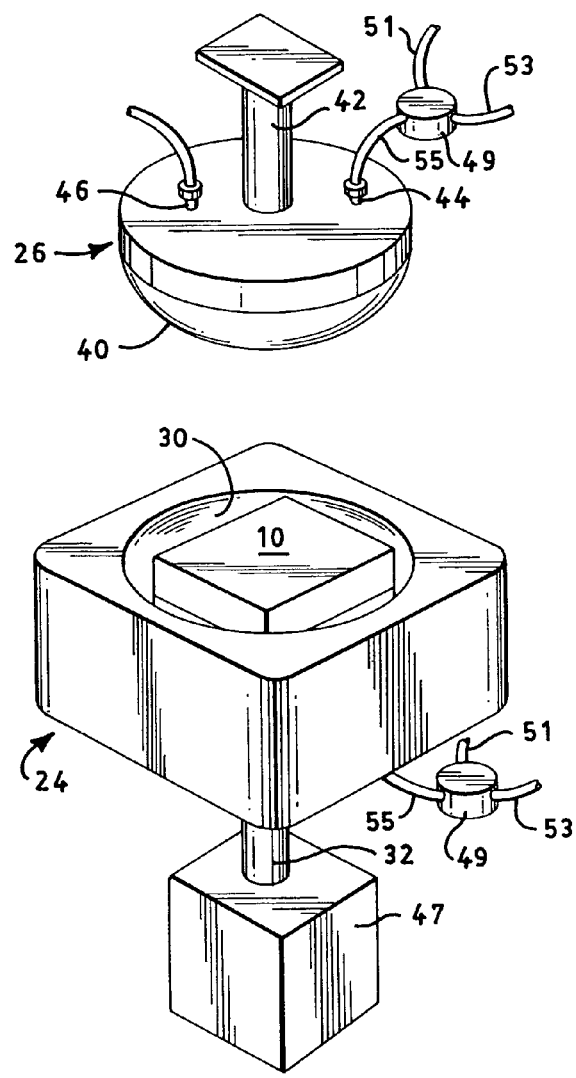
FIG. 2 is a partially schematic, perspective view of one type of a press-forming apparatus suitable for carrying out the method of the invention.

The forming process can be by apparatus of the type shown in FIG. 2. The apparatus includes concave platen 24, convex platen 26, means for driving the platens into and out of pressure-applying relationship with each other and means for alternately heating and cooling the platens during each pressure-applying interval.

Concave platen 24 includes glass member 28 having smooth concave forming surface 30, shaft 32 operatively connected to a suitable drive means, fluid chamber 33, fluid inlet coupling 34 and fluid outlet coupling 36.

Convex platen 26 includes glass member 38 having convex forming surface 40, fixed support means 42, fluid chamber 43, fluid inlet coupling 44 and fluid outlet coupling 46.

As discussed previously, the respective concave and convex forming surfaces 30 and 40 have different radii of curvature which correspond substantially to the relationship expressed by formula II.

The drive means includes a suitable hydraulic piston and cylinder arrangement 47 operatively connected to platen 24 for moving platen 24 into and out of pressure-applying relationship with platen 26.

The heating and cooling means for both the platens includes three way valve means 49, heating fluid conduit 51, cooling fluid conduit 53 and fluid inlet 55 connecting one of the three way valves to each of fluid inlet couplings 34 and 44 of platens 24 and 26 respectively.

Figure 3:
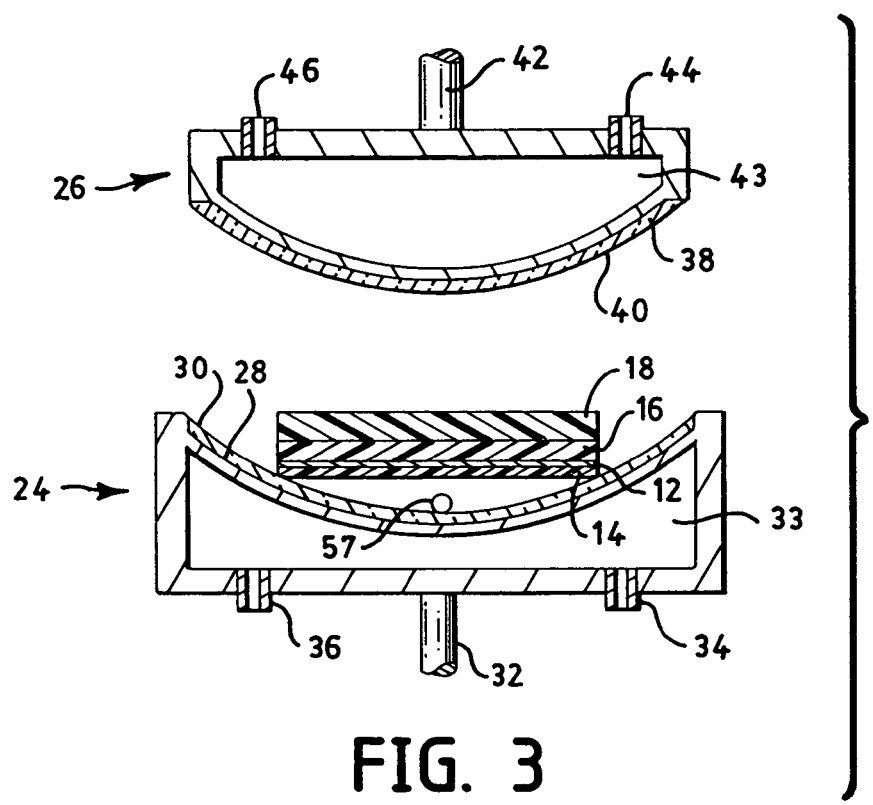
FIG. 3 is a partially schematic, side cross-sectional view of the apparatus illustrated in FIG. 2 showing the carrying out of one step of the method of the invention.

Referring now to FIG. 3, laminated lens blank structure 22 is placed in concave platen 24 so that relatively thin sheet 14 faces concave platen 24 thereby locating light polarizing layer 12 relatively near the concave platen. Also placed on the smooth concave forming surface 30 of platen 24 is a volume of a polymerizable composition 57 comprising a monomer or an oligomer and a polymerization iniatiator. Generally, the volume of polymerizable composition 57 is determined by the requirement to obtain sufficient coverage on the surface of lens blank 22 and is a function of the lens curvature and size. Typically, a volume of from about 0.1 to about 0.8 ml of the polymerizable composition is sufficient. As has been discussed previously, under the conditions of heat and pressure applied by the molding apparatus, polymerizable composition 57 forms a layer of non-uniform thickness on the convex surface of the lens so as to provide a lens having substantially no optical power.

Any suitable monomer or oligomer which will provide an optically clear, durable, scratch resistant, high impact-resistant polymeric film of non-uniform thickness in accordance with the method of the invention may be used. Typical suitable monomeric or oligomeric materials include, for example, acrylates, methacrylates, urethanes, amines and inorganic materials such as, for example, polysiloxanes. The polymerizable composition may include a single monomer or oligomer or a mixture thereof. Any suitable polymerization initiator material may be used. The polymerizable composition may also include other additives to provide their known and predetermined effects. It is preferred to include elastomers such as, for example, nitrocellulose or cellulose acetate butyrate to inhibit cracking of the layer of non-uniform thickness formed from the polymerizable composition. A particularly preferred polymerizable composition for use in accordance with the invention comprises a mixture of tetraethylene glycol methacrylate and dipentaerythritol pentacrylate monomers. The polymerizable composition preferably includes an inhibitor such as hydroquinone.

The polymerization of the monomeric or oligomeric material may be carried out by any suitable polymerization technique such as free radical polymerization, cationic polymerization, ultraviolet polymerization and thermal cure polymerization. It is preferred to employ free radical polymerization.

Figure 4:
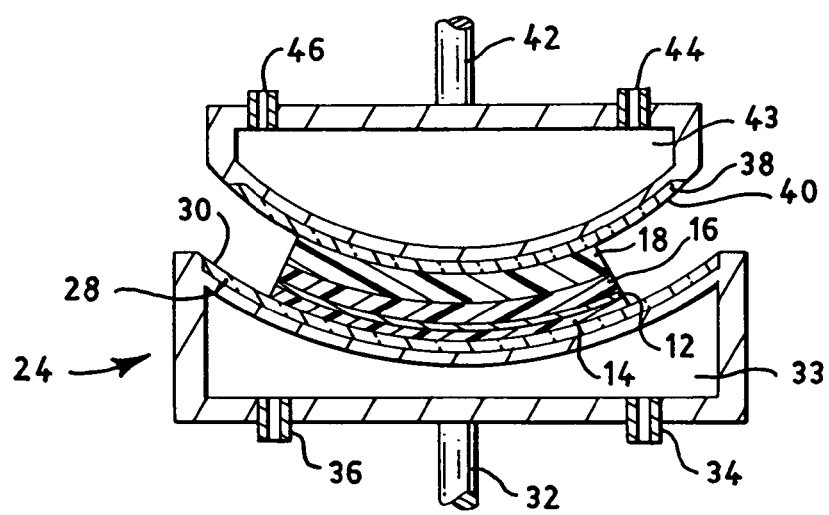
FIG. 4 is a partially schematic, side cross-sectional view of the apparatus illustrated in FIG. 2 showing the carrying out of a heating and pressing step of the method of the invention.

In accordance with the method of the invention, the concave and convex platens are then brought into pressure-applying relationship as shown in FIG. 4 to form, or shape, the laminated lens blank structure 22, under the combined effects of heat and pressure, into a shaped structure and to form a layer of non-uniform thickness from the polymerizable composition thereby forming a shaped lens 50 (FIG. 6) having substantially no optical power. The layer of non-uniform thickness, is characterized by having maximum thickness in the central region of the layer thus providing a lens 50 also having maximum thickness in the central region of the lens.

The amount of pressure applied in any particular instance will vary with the particular nature of the lens blank structure, such as lens blank 22, especially the nature of the thermoplastic materials in the lens blank structure and with the temperatures of the forming surfaces 30 and 40. In the case of a composite structure comprising a light polarizer of the preferred type described above laminated between sheets of cellulose acetate butyrate and polycarbonate, pressures in the range of from about 250 to about 800 lbs/in$^2$ (1724 to 5516 kilopascals) of lens area can be suitably employed. A preferred pressure is about 425 lbs/in$^2$ (2930 kPa).

While pressure is applied to the laminated structure 22, as described, the platens are heated by passing hot water through chambers 33 and 43 of platens 24 and 26, respectively. Surfaces 30 and 40 are continually heated sufficiently to cause deformation of the polarizer layer 12 and the thermoplastic layers 14 and 16, and layer 18 when present, and conformation of the surface of layer 16, or layer 18, when present, to the forming surface 40 of platen 26 as well as conformation of the surface of layer 14 to the layer of non-uniform thickness of the high-impact resistant polymeric material formed in situ according to the invention and conformation of the outer surface of the layer of non-uniform thickness to the forming surface 30 of platen 24. Thus, the application of heat and pressure is sufficient to cause the deformation of the lens blank 22 such that one surface of the blank conforms to the forming surface 40 of platen 26 and the outer surface of the layer of non-uniform thickness of high-impact resistant polymeric material formed in situ according to the invention conforms to the forming surface 30 of platen 24 as well as causing the other surface of the lens blank to conform to the inner surface of the layer of non-uniform thickness.

The employment of conditions sufficient to cause deformation of the lens blank and polymerization of the polymerizable composition with the accompanying formation of a layer of non-uniform thickness of high-impact-resistant material assures that the lens produced according to the invention has an overall non-uniform thickness.

The method of the invention can be employed for the production of lenses which are relatively thick and which desirably have, therefore, the durability associated with such thickness. Lenses of widely varying thicknesses can be produced according to the invention. The method is particularly suitable for the production of relatively thick lenses which, if of uniform thickness, would exhibit unacceptable optical power. The method is particularly useful for the production of substantially no optical power lenses of a thickness of about 50 mils (1.27 mm) or greater, for example, in the range of from about 50 to 150 mils (1.27 to 3.81 mm).

In the production of lenses according to the invention it is convenient to utilize a platen 24 having a forming surface 30 which corresponds to the predetermined curvature of the convex side of the lens to be formed. It is apparent that the convex surface of the layer 51 (FIG. 6) which is formed against forming surface 30 serves as the outer surface of the lens 50 (FIG. 6). One suitable radius of curvature for forming surface 30 for forming a convex lens surface is 3.514 inches.

Using formula III, appropriate for calculating the radii of curvature required for lenses having substantially no optical power, and assuming that the radius of curvature of forming surface 30 ($r_1$) is 3.514 inches, the radius of curvature of the opposed lens surface (and platen) can be determined for the production of a lens of any nominal thickness.

TABLE II shows, for various lenses which can be produced according to the method of the invention, the radii of curvature for the convex and concave forming surfaces, the center thickness, the edge thickness, the diopter and the optical power.

TABLE II

| Convex Radii (inch) | Concave Radii (inch) | Center Thickness (inch) | Edge Thickness* (inch) | Diopter | Optical Power (diopter) |
|---|---|---|---|---|---|
| 3.514 | 3.494 | 0.060 | 0.057 | 6 | −0.001 |
| 3.514 | 3.486 | 0.075 | 0.071 | 6 | −0.001 |
| 2.633 | 2.613 | 0.060 | 0.053 | 8 | −0.001 |
| 2.633 | 2.605 | 0.075 | 0.067 | 8 | −0.001 |

*Edge is 1.5" from the center of the lens.

The conditions of temperature and pressure sufficient to cause deformation of the lens blank and to cause polymerization of the polymerizable composition during production of lenses according to the invention cause the finished lenses to conform to the radii of curvature of the forming surfaces of the platens. The requisite temperature for creating deformation of the lens blank and polymerization of the polymerizable composition to form the layer of non-uniform thickness will vary with the chemical composition of the poymeric materials. Using cellulose acetate butyrate and polycarbonate sheets, molding temperatures of from about 150° F. to about 200° F. A preferred molding temperature is heating at 170° F. for 70 seconds.

The temperatures of the forming surfaces of the platens can be controlled by the passage of heated water and cooled water, as described previously. The platens are preferably preheated i.e., prior to placement of the lens blank therebetween, and are heated to the requisite forming temperature for a heating cycle sufficient to form the desired shaped lens. For example, the forming surfaces of the platens can be preheated for about 20 seconds to about 170° F. in the case of cellulose acetate butyrate and polycarbonate materials prior to placing the lens blank into the mold and closing the mold for about 70 seconds during heating. The mold surfaces are then heated to the requisite forming temperature by the passage of heated water through the platens and the temperature is maintained for a duration, e.g., about 70 seconds, sufficient for the desired lens formation. Thereafter, the temperature of forming surfaces 30 and 40 is reduced by passage of a cooling fluid such as relatively cool water through chambers 33 and 43 of the platens. The cooling fluid is passed through the platens for a period, for example, of about 50 seconds before the press is opened.

Hot water is supplied to the platens through conduit 51 and the relatively cool water is supplied through conduit 53. During the heating cycle, valve 49 opens a connecting passage between conduit 51 and inlet 55 and closes conduit 53. Oppositely, during the cooling cycle, the valve 49 opens a connecting passage between conduit 53 and inlet 55 and closes conduit 51. The transition from the heating cycle to the cooling cycle is carried out by operating valve 49 to mix cool water with the hot water until the hot water is completely displaced by cool water. Transition from the cooling cycle to the heating cycle is carried out by reversing the operation.

Figure 5:
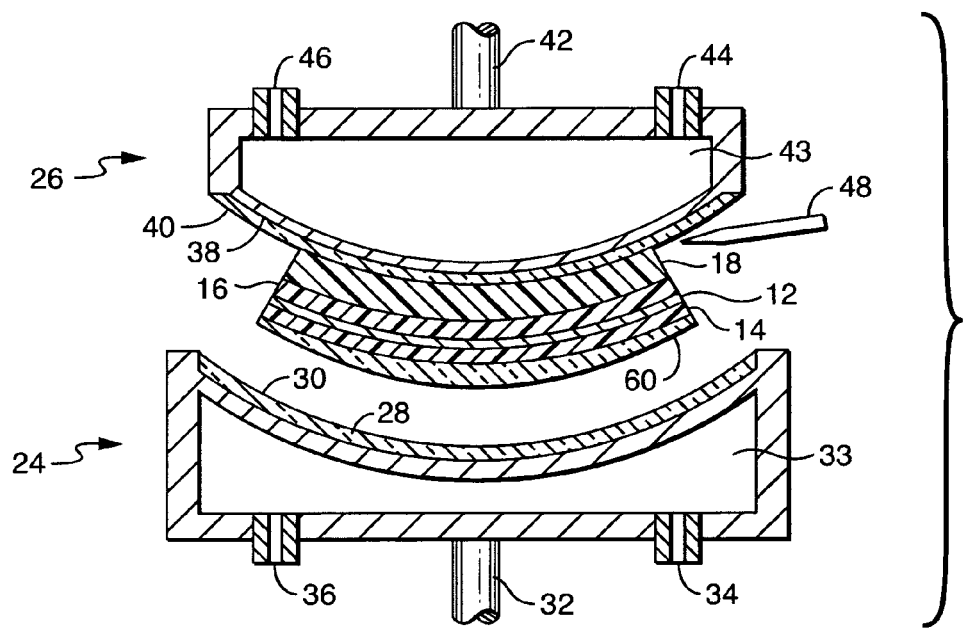
FIG. 5 is a partially schematic, side cross-sectional view of the apparatus illustrated in FIG. 2 showing a lens-removing step according to the method of the invention.

After the cooling operation, platens 24 and 26 are separated to relieve the pressure on the shaped lens and permit its removal, as shown in FIG. 5. The shaped lens may adhere to one of the forming surfaces in which case it may be removed by a stream of compressed air supplied by air nozzle 48.

FIG. 6 illustrates a shaped light-polarizing lens 50, concave on the side formed by concave platen 26 and convex on the side formed by platen 24. There is seen layer 60 of non-uniform thickness which has high scratch resistance and which forms the convex surface of lens 50.

Using the apparatus shown in FIG. 2, and employing the conditions of pressure and temperature described above herein, shaped lenses of substantially no optical power which have a convex surface of a high scratch-resistant and high impact-resistant material can be advantageously provided. It will be appreciated, however, that other apparatus can be used and variations in process conditions, such as heating and cooling cycles, may be employed, depending upon the particular materials present in the lens blank and the polymerizable composition.

Although the invention has been described in detail with respect to various preferred embodiments thereof, the invention is not limited thereto, but rather those skilled in the art will recognize that variations and modifications may be made therein which are within the spirit of the invention and the scope of the appended claims.

What is claimed is:

1. A shaped plastic lens convex on one side and concave on the other side and having substantially no optical power comprising a first substantially uniformly thick layer of thermoplastic polymeric material, a second substantially uniformly thick layer of thermoplastic polymeric material and a third thermoplastic layer of non-uniform thickness and having high scratch resistance, said third layer having maximum thickness in the central region thereof and diminishing gradually in thickness radially toward the periphery thereof, wherein said second substantially uniformly thick layer forms said concave side of the lens and said third layer forms said convex side of the lens.

2. The shaped plastic lens as defined in claim 1 and further including a layer of a light-polarizing material positioned in said first layer of said lens.

3. The shaped plastic lens as defined in claim 2 wherein said first layer of thermoplastic material comprises cellulose triacetate or cellulose acetate butyrate and said second layer of thermoplastic material comprises polycarbonate, said light-polarizing layer being positioned between said cellulose triacetate or cellulose acetate butyrate layer and said polycarbonate layer and said polycarbonate layer forming said concave side of said lens.

4. The shaped plastic lens as defined in claim 3 wherein said polycarbonate layer of said lens comprises a colored layer of polycarbonate and a clear layer of polycarbonate having an outer surface of a high scratch-resistant material, said high scratch-resistant material forming said concave surface of said lens.

5. The shaped plastic lens as defined in claim 4 wherein said lightpolarizing layer is positioned closer to said convex side of said lens than to said concave side of said lens.

6. The shaped plastic lens as defined in claim 1 wherein said third layer comprises a polymer of a tetraethylene glycol methacrylate monomer and a dipentaerythritol pentacrylate monomer.

7. The shaped plastic lens as defined in claim 2 wherein said third layer comprises a polymer of a tetraethylene glycol methacrylate monomer and a dipentaerythritol pentacrylate monomer.

8. The shaped plastic lens as defined in claim 7 wherein said lightpolarizing layer is positioned closer to said convex side of said lens than to said concave side of said lens.

9. The shaped plastic lens as defined in claim 8 wherein said first layer of thermoplastic material comprises cellulose triacetate or cellulose acetate butyrate and said second layer of thermoplastic material comprises polycarbonate, said lightpolarizing layer being positioned between said cellulose triacetate or cellulose acetate butyrate layer and said polycarbonate layer.

* * * * *